United States Patent

[11] 3,624,511

[72] Inventor James Chin-Chun Sui
Washington, D.C.
[21] Appl. No. 848,244
[22] Filed Aug. 7, 1969
[45] Patented Nov. 30, 1971
[73] Assignee Communications Satellite Corporation

[54] NONLINEAR PHASE-LOCK LOOP
3 Claims, 5 Drawing Figs.

[52] U.S. Cl. 325/420, 331/17
[51] Int. Cl. H04b 1/16, H03b 3/04
[50] Field of Search 325/419, 420, 421, 422, 423; 331/17

[56] References Cited

UNITED STATES PATENTS

| | | | |
|---|---|---|---|
| 2,962,666 | 11/1960 | Pollak | 331/17 |
| 3,204,185 | 8/1965 | Robinson | 325/419 |
| 3,262,068 | 7/1966 | Kawai et al. | 331/17 |
| 3,320,544 | 5/1967 | Deman | 331/17 |
| 3,363,194 | 1/1968 | Hileman | 331/17 |
| 3,503,003 | 3/1970 | Grobert | 331/17 |

*Primary Examiner*—Robert L. Griffin
*Assistant Examiner*—James A. Brodsky
*Attorney*—Martin C. Fliesler

ABSTRACT: A conventional phase-lock loop modified by inserting a nonlinear element to provide a faster loop response for small phase differences thereby providing an accelerated lockup time.

NONLINEAR PHASE-LOCK LOOP

BACKGROUND OF THE INVENTION

The invention relates generally to phase-lock loops and more particularly to apparatus for locking the frequency and phase of a locally generated signal to the carrier frequency of a received signal in a communications system.

In one type of coherent digital communications system, signals are transmitted during short time periods or bursts so as to conserve power by not continuously transmitting a carrier. In a second type of system, wherein the signals from a plurality of stations are interleaved or time-multiplexed in a transponder, the signals are also transmitted in bursts. In both cases the receiving station must lock onto the received carrier in frequency and phase at the beginning of each burst in order that synchronization and demodulation of the digital information may be achieved. Locking onto the carrier or "carrier acquisition" is ordinarily done during an initial brief period when the carrier is unmodulated to shorten acquisition time. Since no useful information is passed during this period, and power is being consumed, it is desirable to shorten the carrier acquisition time as much as possible to increase the information carrying capacity of the burst, yet retain reliable operation.

One approach in shortening carrier acquisition time is to widen the bandwidth of the phase-lock loop. However, a wider bandwidth increases phase jitter and thus increases noise power in the loop.

SUMMARY OF THE INVENTION

A phase-lock apparatus is provided having an externally applied signal A sin $(\omega_1 t+\theta_1)$, the received signal, and an internally generated signal A cos $(\omega_2 t+\theta_2)$. It is desired to lock these two signals in frequency and phase. The phase error or difference between the signals is defined as $\Phi=\theta_2-\theta_1$, where $\theta_1$ and $\theta_2$ are the relative phase angles of each signal, respectively. The terms $\omega_1$ and $\omega_2$ represent the frequencies of each signal in radians. Ordinarily, $\omega_1$ and $\omega_2$ can be made close initially if the external signal frequency is known approximately and by adjusting the local signal frequency to be close to it. As the phase difference is reduced in a phase-lock loop, the frequency difference also reduces.

In accordance with one embodiment of the invention, a nonlinear element of chosen characteristics is inserted in the loop to provide a steeper phase detector characteristic for certain values of phase difference so that the lockup time of the loop may be substantially shortened. A particular nonlinear function that provides a steeper characteristic function or "phase acceleration" is a circuit element having a square root signal output in response to a given input signal. However, as will be shown hereinafter, other functions satisfying a given criterion may also be used.

DESCRIPTION OF THE PREFERRED EMBODIMENTS

Figure 1:
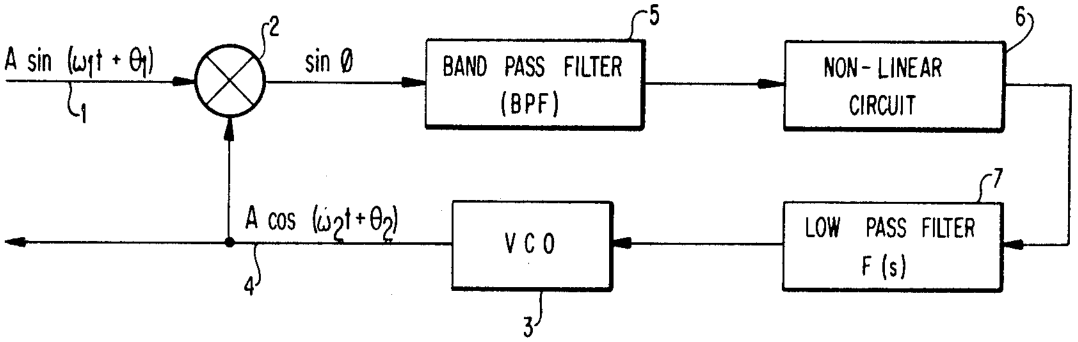
FIG. 1 is a block diagram of a preferred embodiment of the phase-lock loop of this invention.

Referring now to FIG. 1, wherein a block diagram of an embodiment of the phase-lock loop according to the present invention is shown, an input signal, which may be an unmodulated carrier wave signal, for example, A sin $(\omega_1 t+\theta_1)$ is applied on line 1 to a conventional multiplier 2. A second signal A cos $(\omega_2 t+\theta_2)$, which is the output of a voltage-controlled oscillator (VCO) 3, described hereinafter, is applied to multiplier 2 on line 4. Multiplier 2 provides an output signal that is a function of the phase difference between the two input signals.

Analyses of phase-lock loops have shown that the output of the phase detector (multiplier 2) for a conventional loop is essentially a sine function of the difference in phase angles of the signals applied to the multiplier. See for example Andrew J. Viterbi, Principles of Coherent Communication, McGraw-Hill, New York, 1966, chapter 3.

Multiplier 2 output is first applied to a bandpass filter (BPF) 5 having a frequency centered at the difference frequency of the multiplier output. The BPF is a conventional element in phase-lock loops. BPF 5 output is then applied to a nonlinear circuit 6, which may, for example, be a square root circuit. As explained hereinafter the characteristics may be chosen to be other than a square root subject to certain restraints. Circuits capable of providing a square root output in response to a given input signal are known in the art and the circuit per se is not the subject of this invention. The introduction of nonlinear circuit 6 into the loop changes the system characteristics to $\sqrt{\sin\Phi}$ for $0<\Phi<\pi$ and $-\sqrt{-\sin\Phi}$ for $-\pi<\Phi<0$ as shown in FIG. 2.

The output of the nonlinear circuit is applied to a conventional low-pass filter 7 having a transfer characteristic $F(s)$. The voltage-controlled oscillator 3 receives the output from filter 7 to provide a signal that is coherent with the received signal when the loop is in lock.

Figure 2:
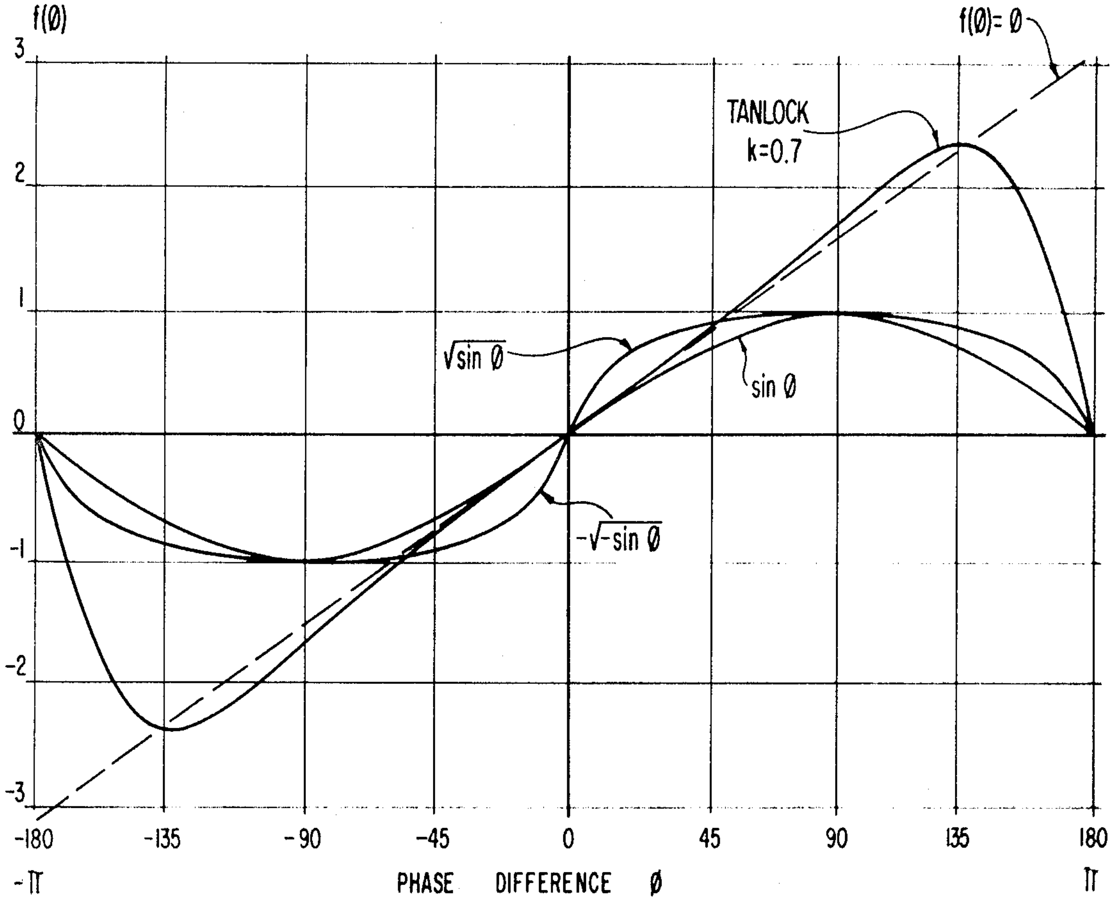
FIG. 2 is a graph of various phase-lock loop characteristics useful in understanding this invention.

FIG. 2 is a graph showing the characteristic characteristics of two types of prior art phase-lock loops and one possible characteristic according to this invention, the square root characteristic, over the range of input phase differences $-\pi$ to $\pi$. The conventional loop characteristic is sin $\Phi$ and the tangent line to sin $\Phi$ at $\Phi=0°$ $((f)\Phi=\Phi)$ is shown. Also, a tanlock loop response for $k=0.7$ is given. The tanlock response is generally of the form $$f(\phi)=\frac{(1+k)\sin\phi}{1+k\cos\phi}$$

Figure 3:
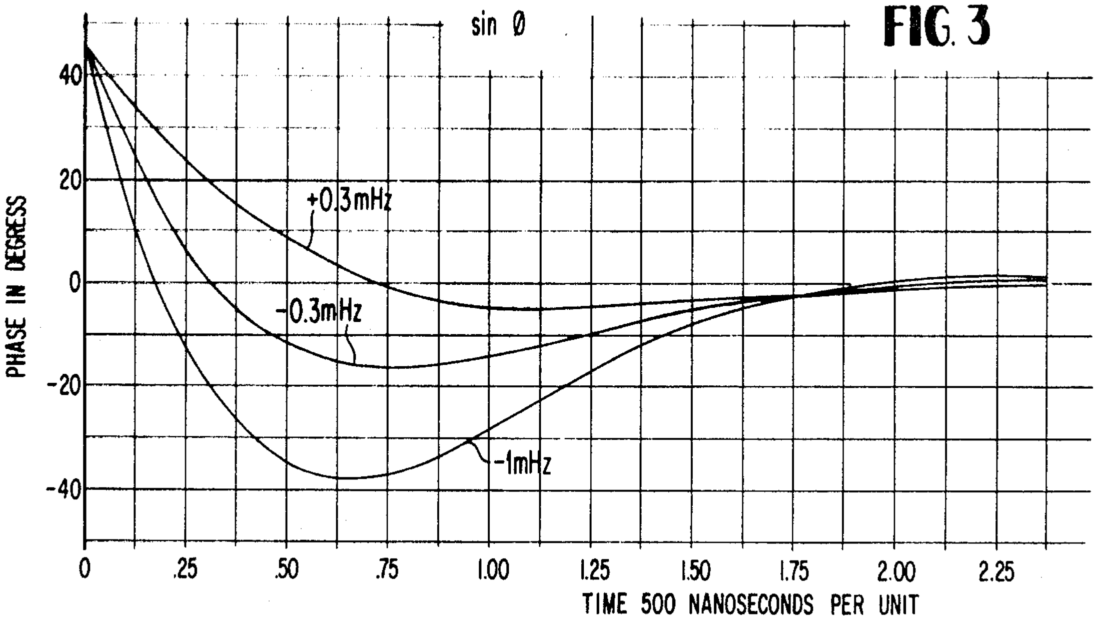
FIGS. 3–5 are graphs of response times of various types of phase-lock loops.
Figure 4:
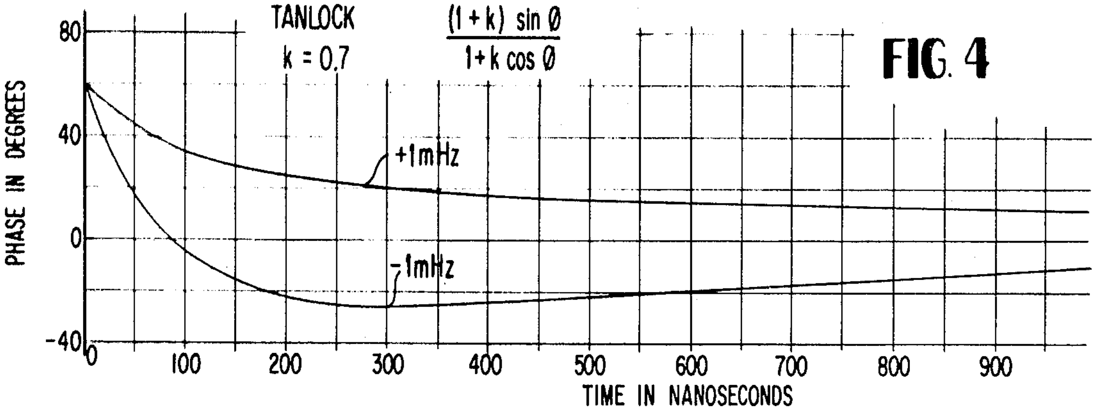
Figure 5:
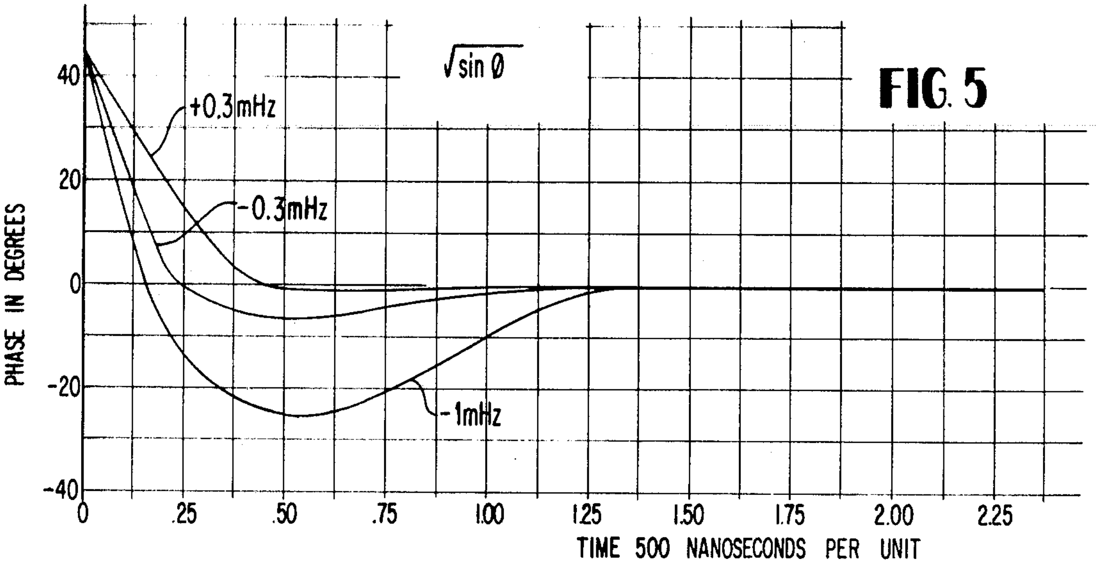

A more thorough discussion of the tanlock is given in U.S. Pat. No. 3,204,185 issued to Lorne M. Robinson on Aug. 31, 1965 and in an article "Tanlock: A Phase-Lock Loop of Extended Tracking Capability", by L. M. Robinson in Proceedings 1962 Conv. on Military Electronics, Feb. 7–9, Los Angeles, Calif. The $\sqrt{\sin\Phi}$ characteristic one of the possible characteristics of this invention is shown. It will be noted that the $\sqrt{\sin\Phi}$ characteristic provides a response, $f(\Phi)$, above the tangent line for small positive values of $\Phi$ and below the tangent line for small negative values of $\Phi$, thereby providing a substantially faster response for these values than the tanlock or conventional sine response loop. This faster characteristic causes the loop to lock up faster. The response in the prior art loops tended to flatten out and approach zero phase error more slowly due to the smaller value of $f(\Phi)$ for small phase differences. Reference to FIGS. 3, 4, and 5 illustrates this effect. Computer simulations of response curves for the sin $\Phi$ characteristic, the tanlock with $k=0.7$, and the $\sqrt{\sin\Phi}$ of the present invention are shown, respectively, in FIGS. 3, 4, and 5. In each case there is an initial phase error of +45° and each loop has an identical $F(s)$. It will be apparent from the characteristic curves that the $\sqrt{\sin\Phi}$ response approaches 0° faster, not only at small phase differences, but also at larger phase differences.

FIG. 3 shows the response time for the conventional sin $\Phi$ characteristic with three different initial frequency offsets: ±0.3 MHz. and −1 MHz. In each case the lock up time is about 875 nanoseconds.

FIG. 4 shows the tanlock response where $k=0.7$ for frequency offsets of ±1 MHz. Lockup is still not achieved at 1,000 nanoseconds.

FIG. 5 shows the $\sqrt{\sin\Phi}$ response for ±0.3 MHz. and −1 MHz. initial frequency offsets. In the worst case of −1 MHz. offset, lockup is achieved in 700 nanoseconds.

While a square root nonlinearity has been described above, a more general statement concerning a suitable nonlinearity can be made. Essentially it is desired to choose a characteristic falling above the tangent line $f(\Phi)=\Phi$ for small values of phase difference. This family of functions is described by $$g(x)=\sum_{k=1}^{n} A_k G_k(x)$$

where $k$ and $n$ are positive integers, $A_k$ is a constant, and
$_k(x)=x^{m_k}x=\sin\Phi\geq 0, 1>m_k>0$
$=-(-x)^{m_k}x=\sin\Phi\leq 0, 1>m_k>0.$
Thus, for the particular response of $\sqrt{\sin\Phi}$ let $n=1$, $m_k=0.5$, and $x=\sin$ $G_1(x)=x^{0.5}=\sqrt{x}x\geq 0.$
$=-(-x)^{0.5}=-\sqrt{-x}\ x\leq 0.$ It will be apparent to those of ordinary skill in this art that function generators may be constructed to satisfy any of a number of the possible characteristic curves defined by the above equation. These generators are not the subject of this invention.

The phase-lock loop described herein has been found to be particularly useful for carrier recovery in the phase-shift keyed (PSK) demodulators of digital communications systems, particularly for satellite communications where burst transmissions are employed to conserve power and where burst transmissions are used for time-division multiplexing.

Obviously, numerous modifications and variations are possible in light of the above teachings. It is therefore to be understood that within the scope of the appended claims the invention may be practiced otherwise than as specifically described herein.

What is claimed and desired to be served by Letters Patent of the United States is:

1. In a phase-lock loop, having a conventional loop characteristic defined by the signal sin Φ wherein Φ is a function of the phase difference between an internally generated signal and an externally applied signal, apparatus for locking the frequency and phase of said internally generated signal to the frequency and phase of said externally applied signal, said apparatus having means for providing said phase difference signal, means, responsive to and receiving said phase difference signal, for low-pass filtering said signal, means, responsive to and receiving said low-pass filtered signal, for providing an output signal whose frequency is a function of the voltage of said low-pass filtered signal, said output signal constituting said internally generated signal, and means for applying said internally generated signal to said phase difference signal means, the improvement comprising nonlinear circuit means, connected between said phase difference signal means and said low-pass filtering means, for providing a faster loop response time than said conventional phase-lock loop wherein the loop characteristic is now a characteristic falling above the tangent line to sin Φ at Φ = 0° for positive values of phase difference $0\leq\Phi\leq 57°$ and falling below the tangent line to −sin Φ at Φ=0° for negative values of phase difference $-57°\geq\Phi\geq 0$.

2. The combination according to claim 1 wherein the improved phase-lock loop having said nonlinear circuit means therein has a characteristic satisfying one of the family of functions described by $$g(x)=\sum_{k=1}^{N} A_k G_k(x)$$

where $k$ and $n$ are positive integers, $A_k$ is a constant, and
$G_k(x)=x^{m_k}, x=\sin\Phi\geq 0, 1>m_k>0$
$=-(-x)^{m_k}, x=\sin\Phi<0, 1>m_k>0$ 3. The combination according to claim 3 wherein $n=1$, $m_k=0.5$, whereby the loop characteristic is described by $\sqrt{\text{SIN}\ \Phi}$ for $\Phi\geq 0$ and $-\sqrt{-\sin\Phi}$ for $\Phi\leq 0$.

* * * * *